United States Patent
Messina et al.

(10) Patent No.: US 11,679,861 B2
(45) Date of Patent: Jun. 20, 2023

(54) ASSEMBLY FOR AN AIRCRAFT, THE ASSEMBLY HAVING A PYLON AND A WING

(71) Applicant: Airbus Operations SAS, Toulouse (FR)

(72) Inventors: Paolo Messina, Toulouse (FR); Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 70 days.

(21) Appl. No.: 17/502,417

(22) Filed: Oct. 15, 2021

(65) Prior Publication Data

US 2022/0204155 A1 Jun. 30, 2022

(30) Foreign Application Priority Data

Oct. 19, 2020 (FR) ...................................... 2010695

(51) Int. Cl.
*B64C 3/32* (2006.01)
*B64F 5/10* (2017.01)
(Continued)

(52) U.S. Cl.
CPC ............... *B64C 3/32* (2013.01); *B64F 5/10* (2017.01); *B64C 3/185* (2013.01); *B64C 3/26* (2013.01)

(58) Field of Classification Search
CPC .. B64C 3/185; B64C 3/26; B64C 3/32; B64C 27/09; B64C 27/12; B64C 27/18;
(Continued)

(56) References Cited

U.S. PATENT DOCUMENTS

2002/0133950 A1* 9/2002 Bullard .................. B23P 19/12
29/898.07
2006/0088398 A1* 4/2006 Lund ..................... F16B 5/0225
411/398
(Continued)

FOREIGN PATENT DOCUMENTS

EP 3626624 A1 3/2020
EP 3689751 A1 8/2020
(Continued)

OTHER PUBLICATIONS

French Search Report; priority document.

*Primary Examiner* — Joshua J Michener
*Assistant Examiner* — Colin Zohoori
(74) *Attorney, Agent, or Firm* — Greer, Burns & Crain, Ltd.

(57) ABSTRACT

An assembly having a pylon with an upper spar and four lateral scoops, a wing with a skin, longitudinal spars and fittings, and, for each lateral scoop, two fastening assemblies, wherein the skin and the fitting each have a first bore and wherein the upper spar and the lateral scoop each have a second bore, wherein each fastening assembly has a screw passing through the first and the second bores, a nut, two eccentric rings, threaded onto one another and onto the screw, and a system for stopping the eccentric rings rotating. The assembly makes it possible to dispense with the use of the spigots while also ensuring the reaction of the shear forces contained in the XY plane by the bolts on account of the reduced tolerances between the various bores, the external and internal surfaces of the eccentric rings and the plain zones of the screws.

14 Claims, 4 Drawing Sheets

(51) Int. Cl.
*B64C 3/18* (2006.01)
*B64C 3/26* (2006.01)

(58) Field of Classification Search
CPC ....... B64C 27/26; B64C 29/06; F16B 5/0233; F16B 5/025; F16B 5/0225
See application file for complete search history.

(56) References Cited

U.S. PATENT DOCUMENTS

| | | | |
|---|---|---|---|
| 2017/0045080 A1* | 2/2017 | Grether | F16B 5/0225 |
| 2019/0161160 A1* | 5/2019 | Tulloch | F16B 5/02 |
| 2020/0087000 A1 | 3/2020 | Martinez et al. | |
| 2020/0148378 A1 | 5/2020 | Pautis et al. | |
| 2020/0262571 A1 | 8/2020 | Berjot et al. | |
| 2020/0277068 A1 | 9/2020 | Tulloch et al. | |
| 2022/0001973 A1* | 1/2022 | Block | B64F 5/10 |
| 2022/0009614 A1* | 1/2022 | Tulloch | B64C 3/32 |
| 2022/0194610 A1* | 6/2022 | Tulloch | B64D 27/26 |
| 2022/0411085 A1* | 12/2022 | Pautis | B64C 3/32 |

FOREIGN PATENT DOCUMENTS

| | | |
|---|---|---|
| EP | 3696089 A1 | 8/2020 |
| WO | 2018192787 A1 | 10/2018 |

\* cited by examiner

ASSEMBLY FOR AN AIRCRAFT, THE ASSEMBLY HAVING A PYLON AND A WING

CROSS-REFERENCES TO RELATED APPLICATIONS

This application claims the benefit of the French patent application No. 2010695 filed on Oct. 19, 2020, the entire disclosures of which are incorporated herein by way of reference.

FIELD OF THE INVENTION

The present invention relates to an assembly for an aircraft, the assembly having a pylon and a wing. The invention also proposes an aircraft having at least one such assembly, and a method for assembling such an assembly.

BACKGROUND OF THE INVENTION

An aircraft conventionally has a fuselage, on either side of which is fastened a wing that supports a pylon, to which a jet engine is fastened. The wing has at least one front spar that extends along the leading edge of the wing and to which the pylon is at least partially fastened.

FIG. 8 shows a top view of an assembly 700 of the prior art that has a pylon 702 and a wing 704.

The wing 704 has a plurality of spars 706a-b extending inside a skin 707.

The pylon 702 has an upper spar 708, a starboard-side lateral panel and a port-side lateral panel that extend vertically on either side of the upper spar 708 and four lateral scoops 710a-b, each one being fastened on the outside against a lateral panel and on either side of the upper spar 708 with one at the rear and one in the middle of the pylon 702.

The assembly 700 also has, for each lateral scoop 710a-b, two tension bolts 712a-b that sandwich the lateral scoop 710a-b and an element of the wing 704, i.e., in this case the spars 706a-b. To this end, the spars 706a-b and the lateral scoops 710a-b have bores passing through them that allow the passage of the threaded shanks of the tension bolts 712a-b. The tension bolts 712a-b ensure a reaction of the forces that are perpendicular to the main plane of the interface that is, in this case, in a vertical main direction.

On account of the tolerances for construction and for positioning of the pylon 702 with respect to the wing 704, it is necessary to provide a substantial clearance between the plain zones of the shanks of the bolts 712a-b and the bores that receive them. In order to react the forces, in the XY plane, vertical pins 714, also called "spigots", are disposed between the pylon 702 and the wing 704. There are two spigots 714 at the front, on the port side and on the starboard side, and a central spigot 714 at the rear.

Although such an installation is entirely satisfactory, it is necessary to find a different installation, which makes it possible to avoid installing the spigots and to give the tension bolts 712a-b the ability to react the shear forces, which are contained in the main plane of the interface, without however requiring tasks of pairing by counter-drilling at the station for assembling the subassemblies, in particular at the stations on final assembly lines.

SUMMARY OF THE INVENTION

An object of the present invention is to propose an assembly for an aircraft, which has a wing and a pylon fastened to the wing and of which the architecture makes it possible to avoid installing spigots while at the same time ensuring the reaction of the forces in the XY plane by the bolts.

To that end, what is proposed is an assembly for an aircraft, the assembly having:

a pylon with an upper spar, two lateral panels that extend vertically beneath the upper spar and four lateral scoops, each one being fastened on the outside against a lateral panel beneath the upper spar, with two lateral scoops per lateral panel and, per lateral panel, there is one lateral scoop at the rear of the pylon and one lateral scoop generally in the middle of the pylon, a wing having a skin, longitudinal spars and fittings that are fastened both to the inside of the skin, and to the longitudinal spars and for each lateral scoop, two fastening assemblies, wherein, for each fastening assembly, the skin and the fitting each have a first bore, which bores extend one another, and the upper spar and the lateral scoop each have a second bore, which bores extend one another, wherein each fastening assembly has:

a screw passing through the first bores and the second bores, and having a plain zone on the side of its head and a threaded zone opposite its head, a nut screwed onto the threaded zone of the screw, an inner eccentric ring, having a barrel and a shoulder, wherein the inner surface of the barrel and the outer surface of the barrel are cylinders of revolution that are offset with respect to one another, wherein the inner eccentric ring is threaded onto the plain zone of the screw, an outer eccentric ring, having a barrel and a shoulder, wherein the inner surface of the barrel and the outer surface of the barrel are cylinders of revolution that are offset with respect to one another, wherein the outer eccentric ring is threaded onto the inner eccentric ring, wherein the two eccentric rings are housed and mounted with a close fit in terms of diameter in the second bores, and a rotation stopping system that prevents the rotation of the eccentric rings, wherein, between the head of the screw and the nut, there are successively sandwiched the shoulder of the inner eccentric ring, the shoulder of the outer eccentric ring, the lateral scoop, the upper spar, the skin, and the fitting.

The invention proposes an assembly for an aircraft, the assembly having:

a pylon with an upper spar, two lateral panels that extend vertically beneath the upper spar and four lateral scoops, each one being fastened on the outside against a lateral panel beneath the upper spar, with two lateral scoops per lateral panel and, per lateral panel, there is one lateral scoop at the rear of the pylon and one lateral scoop generally in the middle of the pylon, a wing having a skin, longitudinal spars and fittings that are fastened both to the inside of the skin, and to the longitudinal spars, and for each lateral scoop, two fastening assemblies, wherein, for each fastening assembly, the upper spar and the lateral scoop each have a first bore, which bores extend one another, and the skin and the fitting each have a second bore, which bores extend one another, wherein each fastening assembly has:

a screw passing through the first bores and the second bores, and having a plain zone on the side of its head and a threaded zone opposite its head, a nut screwed onto the threaded zone of the screw,
an inner eccentric ring, having a barrel and a shoulder, wherein the inner surface of the barrel and the outer surface of the barrel are cylinders of revolution that are offset with respect to one another, wherein the inner eccentric ring is threaded onto the plain zone of the screw,
an outer eccentric ring, having a barrel and a shoulder, wherein the inner surface of the barrel and the outer surface of the barrel are cylinders of revolution that are offset with respect to one another, wherein the outer eccentric ring is threaded onto the inner eccentric ring, wherein the two eccentric rings are housed and mounted with a close fit in terms of diameter in the second bores, and
a rotation stopping system that prevents the rotation of the eccentric rings,
wherein, between the head of the screw and the nut, there are successively sandwiched the shoulder of the inner eccentric ring, the shoulder of the outer eccentric ring, the fitting and the skin, the upper spar and the lateral scoop.

In each of these embodiments, the assembly makes it possible to dispense with the use of the spigots while at the same time ensuring the reaction of the shear forces contained in the XY plane by the bolts on account of the reduced tolerances between the bores, the external and internal surfaces of the eccentric rings, and the plain zones of the screws.

Advantageously, the first bores have a diameter adapted to the diameter of the plain zone of the screw so as to have a close fit.

Advantageously, the inner eccentric ring is threaded onto and has a close fit in terms of diameter on the plain zone of the shank of the screw, and the outer eccentric ring is threaded onto and has a close fit in terms of diameter on the inner eccentric ring.

According to a particular embodiment, each rotation stopping system has a striated washer fastened to the lateral scoop, respectively to the fitting, the shoulder of the outer eccentric ring is striated on each of its faces, and the shoulder of the inner eccentric ring is striated on the face that is in contact with the shoulder of the outer eccentric ring.

According to a particular embodiment, each rotation stopping system has a plate fastened to the lateral scoop, respectively to the fitting, the periphery of the shoulder of each eccentric ring is notched, and, for each shoulder, the plate has a notched sector that cooperates with the notches of the shoulder so as to prevent it from rotating.

The invention also proposes an aircraft having at least one assembly according to one of the preceding variants.

The invention also proposes a method for assembling the assembly according to the first embodiment, wherein the method comprises:
a placement step during which the pylon is positioned with respect to the wing by visually aligning the eight pairs of the first and second bores,
for each pair of the first and second bores:
a presentation step during which a fastening assembly is presented at the pair, by inserting the end of the shank of the screw into the second bores then the first bores,
a positioning step during which the end of the barrel of the outer eccentric ring is brought to the entrance of the second bore of the lateral scoop without entering it,
an adjustment step during which the inner eccentric ring and the outer eccentric ring are manipulated in rotation about their axes so as to align the outer surface of the barrel of the outer eccentric ring with the second bore of the lateral scoop, while at the same time holding the screw in position with respect to the first bores,
a pushing step during which the fastening assembly is pushed into the second bores,
a rotation stopping step during which the rotation stopping system prevents the rotation of the eccentric rings, and
a tightening step during which the nut is tightened on the shank of the screw.

The invention also proposes a method for assembling the assembly according to the second embodiment, wherein the method comprises:
a placement step during which the pylon is positioned with respect to the wing by visually aligning the eight pairs of the first and second bores,
for each pair of the first and second bores:
a presentation step during which a fastening assembly is presented at the pair, by inserting the end of the shank of the screw into the second bores then the first bores,
a positioning step during which the end of the barrel of the outer eccentric ring is brought to the entrance of the second bore of the fitting without entering it,
an adjustment step during which the inner eccentric ring and the outer eccentric ring are moved in rotation about their axes so as to align the outer surface of the barrel of the outer eccentric ring with the second bore of the fitting, while at the same time holding the screw in position with respect to the first bores,
a pushing step during which the fastening assembly is pushed into the second bores,
a rotation stopping step during which the rotation stopping system prevents the rotation of the eccentric rings, and
a tightening step during which the nut is tightened on the shank of the screw.

BRIEF DESCRIPTION OF THE DRAWINGS

The abovementioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
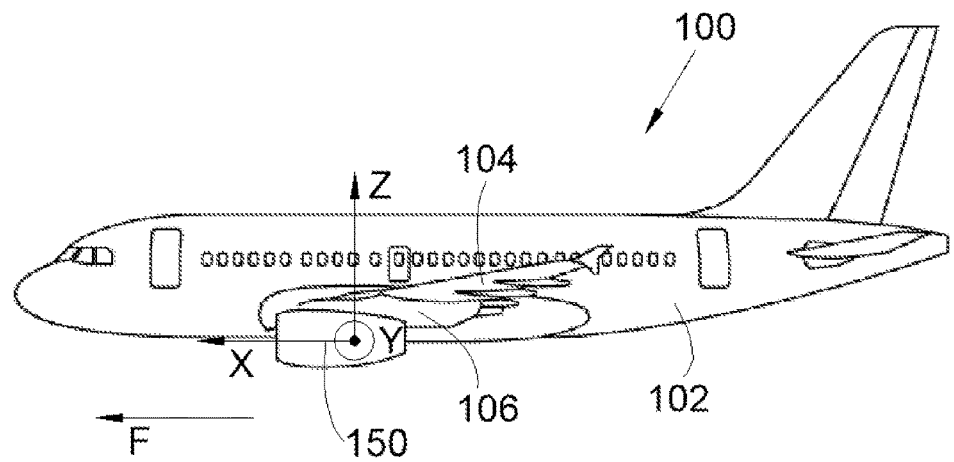
FIG. 1 is a side view of an aircraft having an assembly according to the invention.

FIG. 1 shows an aircraft 100 that has a fuselage 102 to each side of which is fastened a wing 104 that bears at least one jet engine 150, in particular, a turbofan.

The jet engine 150 is fastened beneath the wing 104 by way of a pylon 106.

In the following description, and by convention, the X direction is the longitudinal direction of the jet engine 150, oriented positively towards the front of the aircraft 100, the Y direction is the transverse direction, which is horizontal when the aircraft is on the ground, and the Z direction is the vertical direction, these three directions X, Y and Z being mutually orthogonal.

Moreover, the terms "front" and "rear" are to be considered relative to a direction of forward movement of the aircraft 100 when the jet engine 150 is in operation, this direction being schematically shown by the arrow F in FIG. 1.

Figure 2:
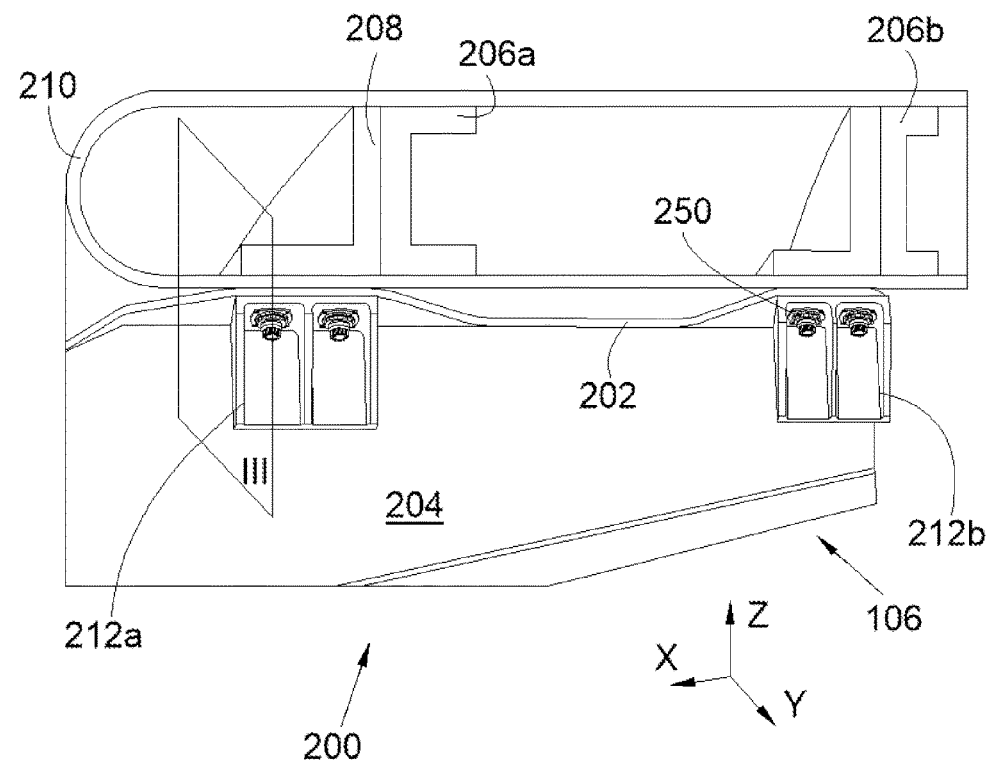
FIG. 2 is a perspective view of an assembly according to a first embodiment of the invention in a side view.
Figure 3:
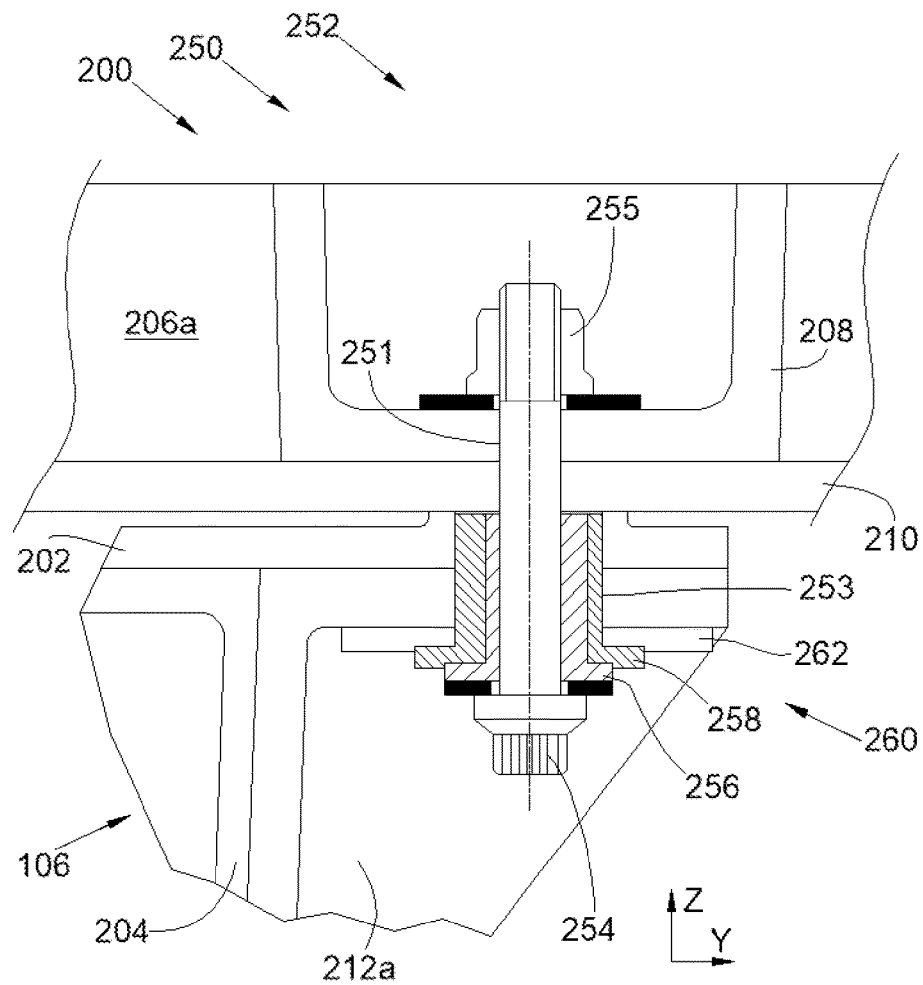
FIG. 3 is a view in section, on the plane III in FIG. 2, of the first embodiment of the invention.

FIG. 2 and FIG. 3 show an assembly 200 according to a first embodiment of the invention.

The assembly 200 according to a first embodiment of the invention has the pylon 106 with an upper spar 202 and two lateral panels 204, namely one port-side lateral panel and one starboard-side lateral panel. The lateral panels 204 extend vertically beneath the upper spar 202.

The assembly 200 also has the wing 104 that has a skin 210 that forms the aerodynamic surface of the wing 104 inside which are disposed longitudinal spars 206a-b and fittings 208, wherein each one, in this case, takes the form of a bracket. The skin 210 is fastened to the longitudinal spars 206a-b and the fittings 208 are disposed against the longitudinal spars 206a-b and each fitting 208 is fastened both to a longitudinal spar 206a-b and to the inside of the skin 210.

The pylon 106 also has four lateral scoops 212a-b, each one being fastened on the outside against a lateral panel 204 beneath the upper spar 202. There are two lateral scoops 212a-b per side, i.e., per lateral panel 204, and, per lateral panel 204, there is one lateral scoop 212b at the rear of the pylon 106 and one lateral scoop 212a generally in the middle of the pylon 106.

Each lateral scoop 212a-b, in this case, takes the form of a bracket and has an upper contact surface that bears beneath the upper spar 202 and a lateral contact surface that bears against the lateral panel 204 to which it is fastened, for example, by bolts, spot welding or the like.

FIG. 3 shows a section along a plane YZ perpendicular to the longitudinal direction X.

For each lateral scoop 212a-b, the assembly 200 has two fastening assemblies 250, wherein each fastening assembly 250 fastens the lateral scoop 212a-b to one of the fittings 208 through the upper spar 202 and the skin 210.

For each fastening assembly 250, the skin 210 and the fitting 208 on the wing side each have a first bore 251. The first bore 251 of the skin 210 and the first bore 251 of the fitting 208 extend one another and are therefore coaxial.

In the same way, the upper spar 202 and the lateral scoop 212a-b on the pylon side each have a second bore 253. The second bore 253 of the upper spar 202 and the second bore 253 of the lateral scoop 212a-b extend one another and are therefore coaxial.

There are therefore eight pairs of the first bores 251 and the same number of second bores 253. The first bore 251 of the skin 210 and the first bore 251 of the fitting 208 have the same diameter. The second bore 253 of the upper spar 202 and the second bore 253 of the lateral scoop 212a-b have the same diameter. Each pair of second bores 253 on the pylon side is aligned with a pair of first bores 251 on the wing side, and the diameter of the second bores 253 is greater than the diameter of the first bores 251.

Each fastening assembly 250 has a bolt 252 with a screw 254 and a nut 255, two eccentric rings 256 and 258 and a rotation stopping system 260 that prevents the rotation of the eccentric rings 256 and 258 before the tightening of the screw 254 and the nut 255. To this end, the shank of the screw 254 has a plain zone on the side of its head and a threaded zone opposite its head. The screw 254 is dimensioned so that the plain zone extends along the first bores 251 and the second bores 253 and the threaded zone is beyond the first bores 251.

The fastening assembly 250 thus has an inner eccentric ring 256 and an outer eccentric ring 258.

Each eccentric ring 256, 258 has a barrel and a shoulder, wherein the inner surface of the barrel and the outer surface of the barrel are cylinders of revolution that are offset with respect to one another, i.e., their axes are parallel but separate.

The inner eccentric ring 256 is threaded onto and has a close fit in terms of diameter on the plain zone of the shank of the screw 254, the outer eccentric ring 258 is threaded onto and has a close fit in terms of diameter on the inner eccentric ring 256. The two eccentric rings 256 and 258 are housed and 'mounted with a close fit' in terms of diameter in the second bores 253. The shank of the screw 254 passes through the first bores 251 and the second bores 253 so that the threaded zone of the screw 254 is screwed into the nut 255.

It should be noted that the concept of a close fit, mentioned above, comprises having a junction having a pin and a bore with the same nominal diameter and with a clearance that is reduced to its minimum to allow the assembly thereof. This type of 'close' fit is known by a person skilled in the art to be able to transmit shear forces by contact without risk of slipping and deterioration of the connection. Such a close fit is for example of the H7g6 type.

The shoulders of the eccentric rings 256 and 258 are sandwiched between a lower bearing face of the lateral scoop 212a-b and a bearing face beneath the head of the screw 254.

It is thus possible, by independently rotating each eccentric ring 256, 258, both to find an adjustment combination that allows the axis of the first bores 251 and the axis of the inner surface of the barrel of the inner eccentric ring 256 to be made coaxial so as to have a screw 254 that is perfectly aligned with this axis on the wing side, and to adjust the position of the outer surface of the barrel of the outer eccentric ring 258 with respect to the second bores 253 on the pylon side.

The first bores 251 have a diameter adapted to the diameter of the plain zone of the screw 254 so as to have a close fit, for example of the H7g6 type.

The gaps between each screw 254 and the bores that surround them are then reduced and the shear forces contained in the XY plane can be reacted by each bolt 252 of each fastening assembly 250 and it is no longer necessary to put spigots in place.

In the embodiment of the invention in FIG. 3, between the head of the screw 254 and the nut 255, there are successively sandwiched the shoulder of the inner eccentric ring 256, the shoulder of the outer eccentric ring 258, the lateral scoop 212a-b, the upper spar 202, the skin 210, and the fitting 208.

In the embodiment of the invention presented in FIG. 3, additional washers have been put in place at the head of the screw 254 and the nut 255.

Figure 7:
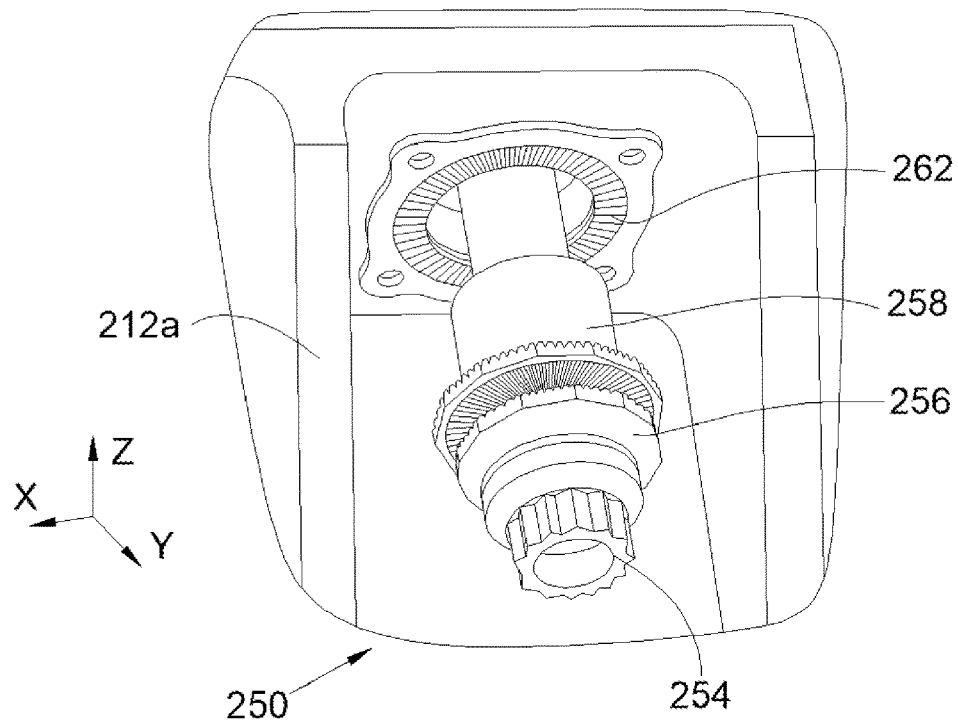
FIG. 7 is a perspective and exploded view of a fastening assembly.
Figure 8:
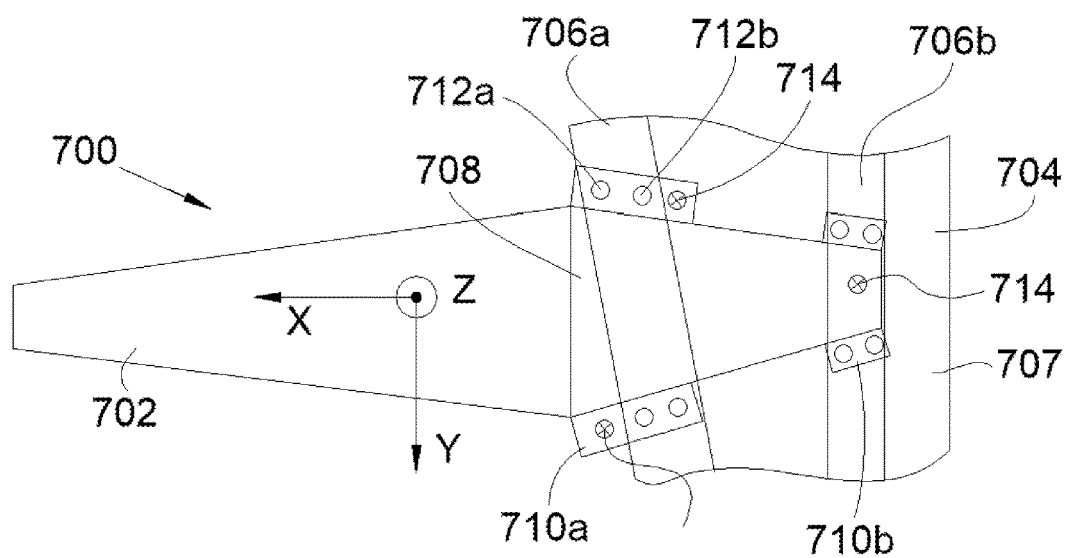
FIG. 8 is a top view of an assembly of the prior art.

In the embodiment in FIG. 3 and FIG. 7, which is an exploded view of the fastening assembly 250, each rotation stopping system 260 has a striated washer 262 fastened to the lateral scoop 212a-b around the second bore 253 and against the face opposite the upper spar 202. The striated washer 262 is, in this case, between the lateral scoop 212a-b and the shoulder of the outer eccentric ring 258.

The shoulder of the outer eccentric ring 258 is also striated on each of its faces, and the shoulder of the inner eccentric ring 256 is also striated on the face that is in contact with the shoulder of the outer eccentric ring 258. Pushing the eccentric rings 256 and 258 into the second bores 253 allows the various striations to be brought into contact and interlocked with each other and stops the rotation of the eccentric rings 256, 258.

Figure 4:
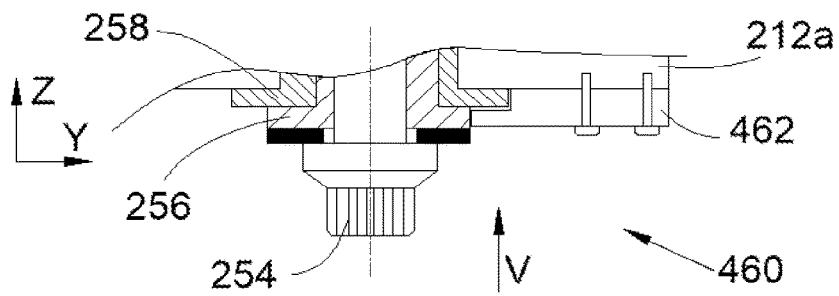
FIG. 4 is a view similar to FIG. 3 for an alternative manner of stopping rotation.
Figure 5:
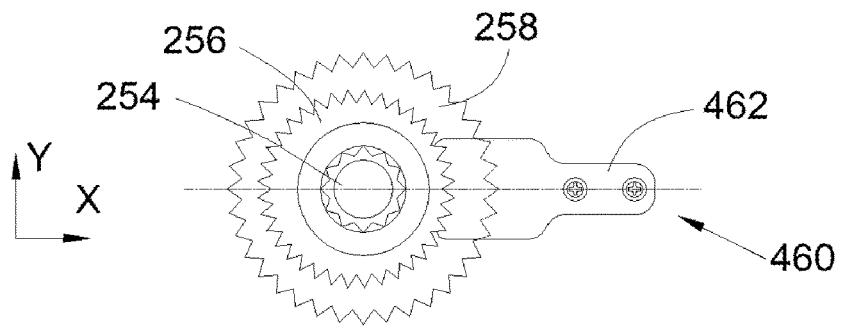
FIG. 5 is a view along the arrow V in FIG. 4 of the alternative manner of stopping rotation.

In the embodiment in FIGS. 4 and 5, each rotation stopping system 460 has a plate 462 fastened to the lateral scoop 212a-b against the face opposite the upper spar 202. In this case the fastening is ensured by screws.

The periphery of the shoulder of each eccentric ring 256, 258 is notched, and, for each shoulder, the plate 462 has a notched sector that is intended to cooperate with the notches of the shoulder so as to prevent it from rotating.

Thus, after the eccentric rings 256 and 258 have been put in place and adjusted, the plate 462 is fastened in order to immobilize the eccentric rings 256 and 258, the screw 254 and the nut 255 can then be tightened in order to finalize the assembly.

A method for assembling the assembly 200 comprises:
- a placement step during which the pylon 106 is positioned with respect to the wing 104 by visually aligning the eight pairs of the first and second bores 251 and 253, for each pair of the first and second bores 251 and 253:
- a presentation step during which a fastening assembly 250 is presented at the pair, by inserting the end of the shank of the screw 254 into the second bores 253 then the first bores 251, on account of the close fit of the first bores 251, the screw 254 is fixed in position concentrically with respect to the axis of the first bores 251,
- a positioning step during which the end of the barrel of the outer eccentric ring 258 is brought to the entrance of the second bore 253 of the lateral scoop 212a-b without entering it,
- an adjustment step during which the inner eccentric ring 256 and the outer eccentric ring 258 are manipulated in rotation about their axes so as to align the outer surface of the barrel of the outer eccentric ring 258 with the second bore 253 of the lateral scoop 212a-b, while at the same time holding the screw 254 in position with respect to the first bores 251,
- a pushing step during which the fastening assembly 250 is pushed into the second bores 253,
- a rotation stopping step during which the rotation stopping system 260 prevents the rotation of the eccentric rings 256 and 258, and
- a tightening step during which the nut 255 is tightened on the shank of the screw 254.

During the presentation step, the inner eccentric ring 256 and the outer eccentric ring 258, and in this case an additional washer, are threaded onto the shank of the screw 254, before the insertion of the shank of the screw 254.

Preferentially, the adjustment of the inner eccentric ring 256 and the adjustment of the outer eccentric ring 258 are effected with pliers that grip the shoulders. To this end, the notches in the shoulders in the embodiment in FIG. 5 make the meshing of the shoulders by the pliers easier. In the embodiment in FIG. 3, the notches can be replaced by a polygonal, or hexagonal or else bi-hexagonal shape.

Figure 6:
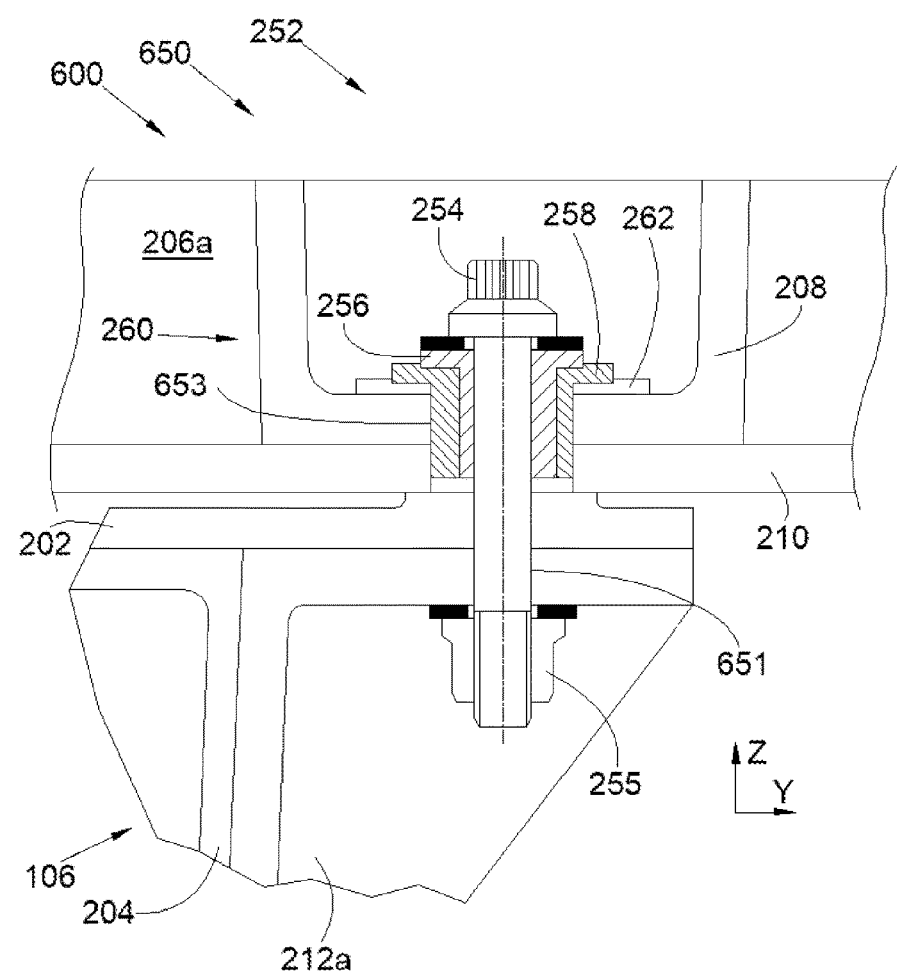
FIG. 6 is a view similar to FIG. 3 for a second embodiment of the invention.

FIG. 6 shows a second embodiment that differs from the first embodiment by the fact that the orientation of the assembly 600 is reversed.

For each lateral scoop 212a-b, the assembly 600 has two fastening assemblies 650 wherein each fastening assembly 650 fastens the lateral scoop 212a-b to one of the fittings 208 through the upper spar 202 and the skin 210.

For each fastening assembly 650, the upper spar 202 and the lateral scoop 212a-b on the pylon side each have a first bore 651. The first bore 651 of the upper spar 202 and the first bore 651 of the lateral scoop 212a-b extend one another and are therefore coaxial.

In the same way, the skin 210 and the fitting 208 on the wing side each have a second bore 653. The second bore 653 of the skin 210 and the second bore 653 of the fitting 208 extend one another and are therefore coaxial.

There are, therefore, eight pairs of the first bores 651 and the same number of second bores 653. The first bore 651 of the upper spar 202 and the first bore 651 of the lateral scoop 212a-b have the same diameter. The second bore 653 of the skin 210 and the second bore 653 of the fitting 208 have the same diameter. Each pair of second bores 653 on the wing side is aligned with a pair of first bores 651 on the pylon side, and the diameter of the second bores 653 is greater than the diameter of the first bores 651.

Each fastening assembly 650 has a bolt 252 with a screw 254 and a nut 255, two eccentric rings 256 and 258 and a rotation stopping system 260 that prevents the rotation of the eccentric rings 256 and 258. To this end, the shank of the screw 254 has a plain zone on the side of its head and a threaded zone opposite its head. The screw 254 is dimensioned so that the plain zone extends along the first bores 651 and the second bores 653 and the threaded zone is beyond the first bores 651.

The fastening assembly 650 thus has an inner eccentric ring 256 and an outer eccentric ring 258.

Each eccentric ring 256, 258 has a barrel and a shoulder, wherein the inner surface of the barrel and the outer surface of the barrel are cylinders of revolution that are offset with respect to one another, i.e., their axes are parallel but separate.

The inner eccentric ring 256 is threaded onto and has a close fit in terms of diameter on the plain zone of the shank of the screw 254, the outer eccentric ring 258 is threaded onto and has a close fit in terms of diameter on the inner eccentric ring 256. The two eccentric rings 256 and 258 are housed and 'mounted with a close fit' in terms of diameter in the second bores 653. The shank of the screw 254 passes through the first bores 651 and the second bores 653 so that the threaded zone of the screw 254 is screwed into the nut 255.

It should be noted that the concept of a close fit, mentioned above, comprises having a junction having a pin and a bore with the same nominal diameter and with a clearance that is reduced to its minimum to allow the assembly thereof. This type of 'close' fit is known by a person skilled in the art to be able to transmit shear forces by contact without risk of slipping and deterioration of the connection. Such a close fit is for example of the H7g6 type.

The shoulders of the eccentric rings 256 and 258 are sandwiched between a bearing face of the fitting 208 and a bearing face beneath the head of the screw 254.

It is thus possible, by independently rotating each eccentric ring 256, 258, both to find an adjustment combination that allows the axis of the first bores 651 on the pylon side and the axis of the inner surface of the barrel of the inner eccentric ring 256 to be made coaxial so as to have a screw 254 that is perfectly aligned with this axis, and to adjust the position of the outer surface of the barrel of the outer eccentric ring 258 with respect to the second bores 653 on the wing side.

The first bores 651 have a diameter adapted to the diameter of the plain zone of the screw 254 so as to have a close fit, for example of the H7g6 type.

The gaps between each screw 254 and the bores that surround them are then reduced and the shear forces contained in the XY plane can be reacted by each bolt 252 of each fastening assembly 650 and it is no longer necessary to put spigots in place.

In the embodiment of the invention in FIG. 6, between the head of the screw 254 and the nut 255, there are successively sandwiched the shoulder of the inner eccentric ring 256, the shoulder of the outer eccentric ring 258, the fitting 208, the skin 210, the upper spar 202, and the lateral scoop 212a-b.

In the embodiment of the invention presented in FIG. 6, additional washers have been put in place at the head of the screw 254 and the nut 255.

In the embodiment in FIG. 6, the striated washer 262 of the rotation stopping system 260 is fastened to the fitting 208 around the second bore 653 and against the face opposite the skin 210. The striated washer 262 is in this case between the fitting 208 and the shoulder of the outer eccentric ring 258. The other striations on the shoulder of the inner eccentric ring 256 and the shoulder of the outer eccentric ring 258 are also present.

The stopping system in FIGS. 4 and 5 can also be implemented with the plate 462 fastened to the fitting 208 against the face opposite the skin 210.

A method for assembling the assembly 600 comprises:
a placement step during which the pylon 106 is positioned with respect to the wing 104 by visually aligning the eight pairs of the first and second bores 651 and 653,
for each pair of the first and second bores 651 and 653:
a presentation step during which a fastening assembly 650 is presented at the pair, by inserting the end of the shank of the screw 254 into the second bores 653 then the first bores 651, on account of the close fit of the first bores 651, the screw 254 is fixed in position concentrically with respect to the axis of the first bores 651,
a positioning step during which the end of the barrel of the outer eccentric ring 258 is brought to the entrance of the second bore 653 of the fitting 208 without entering it,
an adjustment step during which the inner eccentric ring 256 and the outer eccentric ring 258 are manipulated in rotation about their axes so as to align the outer surface of the barrel of the outer eccentric ring 258 with the second bore 653 of the fitting 208, while at the same time holding the screw 254 in position with respect to the first bores 651,
a pushing step during which the fastening assembly 650 is pushed into the second bores 653,
a rotation stopping step during which the rotation stopping system 260 prevents the rotation of the eccentric rings 256 and 258, and
a tightening step during which the nut 255 is tightened on the shank of the screw 254.

During the presentation step, the inner eccentric ring 256 and the outer eccentric ring 258, and in this case an additional washer, are threaded onto the screw 254, before the insertion of the shank of the screw 254.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
a pylon comprising:
an upper spar,
two lateral panels that extend vertically beneath the upper spar, and
four lateral scoops, each one being fastened on the outside against a lateral panel beneath the upper spar, with two lateral scoops per lateral panel and, per lateral panel, there is one lateral scoop at the rear of the pylon and one lateral scoop generally in the middle of the pylon,
a wing comprising:
a skin,
longitudinal spars, and
fittings that are fastened both to an inside of the skin and to the longitudinal spars, and
for each lateral scoop, two fastening assemblies, wherein, for each fastening assembly, the skin and one of the fittings each have a first bore, which bores extend one another, and the upper spar and the lateral scoop each have a second bore, which bores extend one another, wherein each fastening assembly has:
a screw passing through the first bores and the second bores, and having a plain zone on the side of a head thereof and a threaded zone opposite the head,
a nut screwed onto the threaded zone of the screw,
an inner eccentric ring, having a barrel and a shoulder, wherein an inner surface of the barrel and an outer surface of the barrel are cylinders of revolution that are offset with respect to one another, wherein the inner eccentric ring is threaded onto the plain zone of the screw,
an outer eccentric ring, having a barrel and a shoulder, wherein an inner surface of the barrel and an outer surface of the barrel are cylinders of revolution that are offset with respect to one another, wherein the outer eccentric ring is threaded onto the inner eccentric ring, wherein the inner eccentric ring and the outer eccentric ring are housed and mounted with a close fit in terms of diameter in the second bores, and
a rotation stopping system that prevents a rotation of the inner eccentric ring and the outer eccentric ring,
wherein, between the head of the screw and the nut, there are successively sandwiched the shoulder of the inner eccentric ring, the shoulder of the outer eccentric ring, the lateral scoop, the upper spar, the skin, and the fitting.

2. The assembly according to claim 1, wherein the first bores have a diameter adapted to the diameter of the plain zone of the screw so as to have a close fit.

3. The assembly according to claim 1, wherein the inner eccentric ring is threaded onto and has a close fit in terms of diameter on the plain zone of a shank of the screw, and wherein the outer eccentric ring is threaded onto and has a close fit in terms of diameter on the inner eccentric ring.

4. The assembly according to claim 1, wherein each rotation stopping system has a striated washer fastened to the lateral scoop, respectively to the fitting, wherein the shoulder of the outer eccentric ring is striated on each face thereof, and wherein the shoulder of the inner eccentric ring is striated on the face that is in contact with the shoulder of the outer eccentric ring.

5. The assembly according to claim 1, wherein each rotation stopping system has a plate fastened to the lateral scoop, respectively to the fitting, wherein a periphery of the shoulder of each eccentric ring is notched, and wherein, for each shoulder, the plate has a notched sector that cooperates with the notched shoulder so as to prevent the plate from rotating.

6. An aircraft having at least one assembly according to claim 1.

7. A method for assembling the assembly of claim 1, wherein the method comprises:
   a placement step during which the pylon is positioned with respect to the wing by visually aligning eight pairs of the first and second bores,
   for each pair of the first and second bores,
      a presentation step during which a fastening assembly is presented at said pair, by inserting an end of a shank of the screw into the second bores then the first bores,
      a positioning step during which an end of the barrel of the outer eccentric ring is brought to an entrance of the second bore of the lateral scoop without entering the second bore,
      an adjustment step during which the inner eccentric ring and the outer eccentric ring are manipulated in rotation about their axes so as to align the outer surface of the barrel of the outer eccentric ring with the second bore of the lateral scoop, while at the same time holding the screw in position with respect to the first bores,
      a pushing step during which the fastening assembly is pushed into the second bores,
      a rotation stopping step during which the rotation stopping system prevents the rotation of the inner eccentric ring and the outer eccentric ring, and
      a tightening step during which the nut is tightened on the shank of the screw.

8. An assembly for an aircraft, said assembly comprising:
   a pylon comprising:
      an upper spar,
      two lateral panels that extend vertically beneath the upper spar, and
      four lateral scoops, each one being fastened on an outside against a lateral panel beneath the upper spar, with two lateral scoops per lateral panel and, per lateral panel, there is one lateral scoop at a rear of the pylon and one lateral scoop generally in a middle of the pylon,
   a wing comprising:
      a skin,
      longitudinal spars, and
      fittings that are fastened both to an inside of the skin and to the longitudinal spars, and
   for each lateral scoop, two fastening assemblies, wherein, for each fastening assembly, the upper spar and the lateral scoop each have a first bore, which first bores extend one another, and the skin and one of the fittings each have a second bore, which second bores extend one another,
   wherein each fastening assembly comprises:
      a screw passing through the first bores and the second bores, and having a plain zone on a side of a head thereof and a threaded zone opposite the head,
      a nut screwed onto the threaded zone of the screw,
      an inner eccentric ring, having a barrel and a shoulder, wherein an inner surface of the barrel and an outer surface of the barrel are cylinders of revolution that are offset with respect to one another, wherein the inner eccentric ring is threaded onto the plain zone of the screw,
      an outer eccentric ring, having a barrel and a shoulder, wherein an inner surface of the barrel and an outer surface of the barrel are cylinders of revolution that are offset with respect to one another, wherein the outer eccentric ring is threaded onto the inner eccentric ring, wherein the inner eccentric ring and the outer eccentric ring are housed and mounted with a close fit in terms of diameter in the second bores, and
      a rotation stopping system that prevents a rotation of the inner eccentric ring and the outer eccentric ring,
   wherein, between the head of the screw and the nut, there are successively sandwiched the shoulder of the inner eccentric ring, the shoulder of the outer eccentric ring, the fitting, the skin, the upper spar, and the lateral scoop.

9. The assembly according to claim 8, wherein the first bores have a diameter adapted to the diameter of the plain zone of the screw so as to have a close fit.

10. The assembly according to claim 8, wherein the inner eccentric ring is threaded onto and has a close fit in terms of diameter on the plain zone of a shank of the screw, and wherein the outer eccentric ring is threaded onto and has a close fit in terms of diameter on the inner eccentric ring.

11. The assembly according to claim 8, wherein each rotation stopping system has a striated washer fastened to the lateral scoop, respectively to the fitting, wherein the shoulder of the outer eccentric ring is striated on each face thereof, and wherein the shoulder of the inner eccentric ring is striated on the face that is in contact with the shoulder of the outer eccentric ring.

12. The assembly according to claim 8, wherein each rotation stopping system has a plate fastened to the lateral scoop, respectively to the fitting, wherein a periphery of the shoulder of each eccentric ring is notched, and wherein, for each shoulder, the plate has a notched sector that cooperates with the notched shoulder so as to prevent the plate from rotating.

13. An aircraft having at least one assembly according to claim 8.

14. A method for assembling the assembly of claim 8, wherein the method comprises:
   a placement step during which the pylon is positioned with respect to the wing by visually aligning eight pairs of the first and second bores,
   for each pair of the first and second bores,
      a presentation step during which a fastening assembly is presented at said pair, by inserting the end of a shank of the screw into the second bores then the first bores,
      a positioning step during which an end of the barrel of the outer eccentric ring is brought to an entrance of the second bore of the fitting without entering the second bore,
      an adjustment step during which the inner eccentric ring and the outer eccentric ring are manipulated in rotation about axes of the inner eccentric ring and the outer eccentric ring so as to align the outer surface of the barrel of the outer eccentric ring with the second bore of the fitting, while at the same time holding the screw in position with respect to the first bores, a pushing step during which the fastening assembly is pushed into the second bores, a rotation stopping step during which the rotation stopping system prevents the rotation of the inner eccentric ring and the outer eccentric ring, and a tightening step during which the nut is tightened on the shank of the screw.

\* \* \* \* \*